Figure 1:
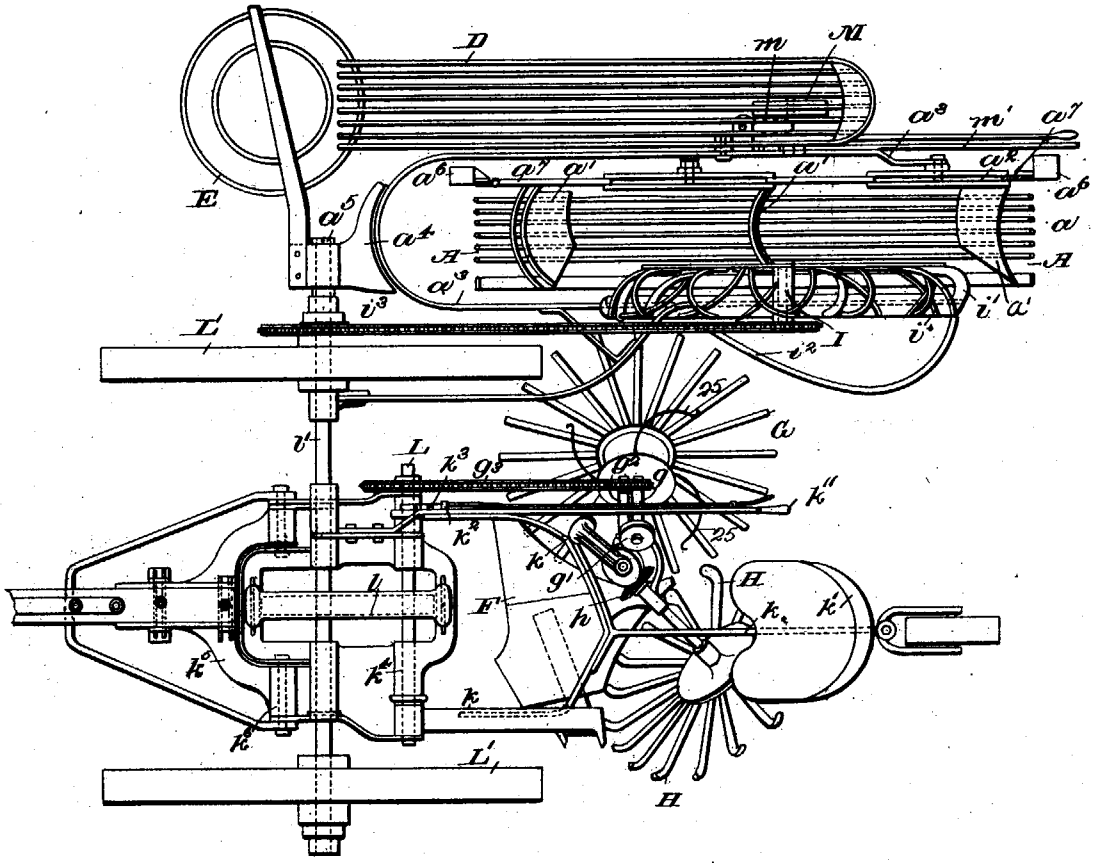

2 Sheets—Sheet 1.

J. N. COCKER.

POTATO HARVESTER.

No. 11,674. Reissued June 28, 1898.

Witnesses
Jos. C. Stack.
Walter Dowdsay

Inventor
Joseph North Cocker
By Richards & Co
Attorney

THE NORRIS PETERS CO., PHOTO-LITHO., WASHINGTON, D. C.

2 Sheets—Sheet 2.

J. N. COCKER.

POTATO HARVESTER.

No. 11,674. Reissued June 28, 1898.

Witnesses
Jos. C. Stack.
Walter Douglas

Inventor
Joseph North Cocker
by Richards & Co
Attorney

THE NORRIS PETERS CO., PHOTO-LITHO., WASHINGTON, D. C.

UNITED STATES PATENT OFFICE.

JOSEPH NORTH COCKER, OF WEST DEVONPORT, TASMANIA.

POTATO-HARVESTER.

SPECIFICATION forming part of Reissued Letters Patent No. 11,674, dated June 28, 1898.

Original No. 553,511, dated January 28, 1896. Application for reissue filed February 19, 1898. Serial No. 670,988.

*To all whom it may concern:*

Be it known that I, JOSEPH NORTH COCKER, farmer, a subject of the Queen of Great Britain, residing at West Devonport, in the British Colony of Tasmania, have invented new and useful Improvements in Potato-Harvesters, of which the following is a specification.

This invention relates to a potato-plow for which I obtained United States Letters Patent Nos. 463,098 and 511,511, dated respectively the 10th day of November, 1891, and the 26th day of December, 1893. I have found in practice that there were several objections to a machine constructed as described in the specifications of those patents and I have therefore devised the present invention.

It consists in a potato-harvester constructed somewhat as before with a large elevator-wheel made with a series of bars with spaces between in addition to being provided with projecting vanes or blades adapted to carry the earth up around the inner screen extending for about one-quarter of a revolution, over the top of which the potatoes fall onto an inclined screen leading to another inclined screen or chute, on the lower end of which a bag or basket may be supported to receive the potatoes. Behind the share used to raise the potatoes from the ground are arranged two rotating spider-wheels, one set nearly horizontal and another almost vertical or at approximately right angles to said horizontal spider, which latter is arranged to carry the tubers around into a shallow curved trough, whereby they are directed into the elevator-wheel, while a third spider arranged vertically on the inner side of the elevator-wheel serves to separate the top or halm from the potatoes and deliver it at the back of the machine. This third spider is provided with a number of curved bars for said purpose of separating the halm as well as with a number of curved feeder-blades which direct the potatoes into the elevator-wheel out of the shallow curved trough above referred to. Suitable-shaped shields are arranged inside the machine, so that any earth which may fall from the screens will be delivered through the open side of the elevator-wheel onto the ground, and bevel, sprocket, or other gearing is provided to enable the rotating spider-wheels above referred to to be driven from the axle of the main drive-wheels. Suitable guiding and adjusting devices are provided in some convenient position adjacent to the driver's seat to enable him to easily manipulate the machine while it is in operation.

The elevator-wheel is supported by and works around friction-rollers mounted upon a removable framing, and said wheel is fitted around its periphery with projections adapted to enter the surface of the ground and thus cause said elevator-wheel to revolve. The two rotating spiders above referred to as being arranged behind the share are carried upon a pivoted frame whose height can be adjusted by means of a long hand-lever fitted with a catch to retain it in any desired position, and said spiders are driven by sprocket and bevel gearing from a sprocket-wheel upon an intermediate shaft driven by spur-gearing from the spindle or axle of the main bull or drive wheels of the machine. The delivery-chute is preferably arranged on the side opposite to the share and spiders, and a small land-wheel upon one arm of a long hand-lever is provided on that side to allow the elevator-wheel to be raised or lowered as required—as, for instance, when the machine is traveling along a road.

If preferred, the elevator-wheel can be detached from the machine, which is then simply a potato-digger arranged to deposit the potatoes to one side upon the surface of the ground. For this purpose said elevator is attached to a casting mounted upon a projecting end of the axle of the main drive-wheels and secured thereupon by means of a split pin and collar.

Figure 3:
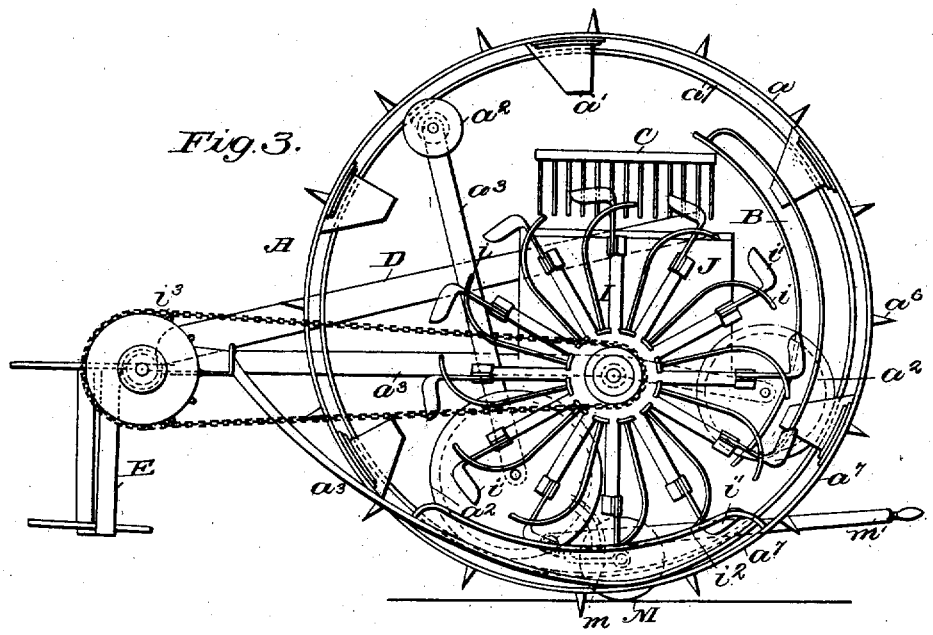
Figure 2:
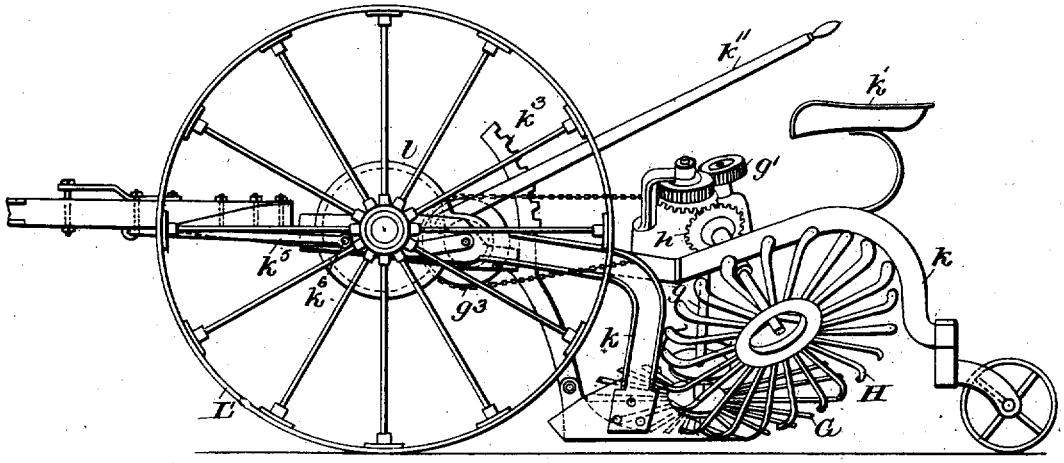

Referring to the accompanying drawings, Figure 1 is a sectional plan of a potato-harvester embodying my improvements, while Fig. 2 is an elevation of the near side of said machine with the elevator-wheel removed, and Fig. 3 is a side elevation of the elevator-wheel and adjacent parts shown detached from the machine.

The same letters of reference indicate the same parts in all the figures.

A represents the large elevator-wheel, which is, according to this invention, formed of a series of bars *a*, with spaces between, as clearly illustrated in section in Fig. 1, while $a'$ $a'$ represent the vanes or blades which serve to carry the earth and potatoes up an inner screen B, (see Fig. 3,) extending for about a quarter of a revolution around the inside of the elevator-wheel A.

C, Fig. 3, represents the inclined screen which is arranged below the upper end of the screen B and which serves to conduct the potatoes onto another inclined screen or chute D, beneath the lower end of which a bag or other receptacle can be supported to receive the potatoes, said receptacle being placed upon a suitable frame or support, such as is illustrated at E.

F represents the share used for raising the potatoes from the ground, while G H I represent the three rotating spiders above referred to. Of these the one marked G is almost horizontal and is arranged on the dug or potato-delivering side of the share F, a slight incline being given to it, so that the edge farthest from the share will be slightly raised, said share being shaped, as illustrated in Fig. 1, so that it extends partly around said spider G. The second spider H is arranged vertically or approximately at right angles to the first one. The third spider I is also arranged vertically and works at the side of the elevator-wheel A. It serves to separate the tops or halm from the potatoes and to deliver them at the back of the machine, for which purpose it is provided with a number of curved bars $i$. It is also provided with a number of curved feeder-blades $i'$ for withdrawing the potatoes out of a shallow curved trough $i^2$, (arranged underneath said spider I between the spider G and the elevator-wheel A,) and delivering them into said elevator-wheel.

A sheet-metal or other chute, such as J, is arranged, as illustrated in Fig. 3, to conduct away any dirt which might fall through the screen C and to deliver it through the open side of the elevator-wheel A onto the ground, as in the machine described in the former specifications above referred to.

The approximately-vertical spindle $g$ of the spider G is mounted in bearings secured to a frame K, carrying the share F and driver's seat $k'$, and motion is imparted to it through the medium of the spur-gear $g'$, horizontal spindle $g^2$, and sprocket-gearing $g^3$ from a counter-shaft L, to which motion is communicated by spur-gearing $l$ from the main axle $l'$, upon which the main drive-wheels L' L' are secured.

The spider H is driven by bevel-gear $h$ from the spindle $g^2$, while the spider I is driven by sprocket-gear $i^3$ from the main axle $l'$, as clearly illustrated in Fig. 1.

The large elevator-wheel A is supported by and works around antifriction-rollers $a^2$, mounted upon the frame $a^3$, which carries the curved iron trough $i^2$ and is secured to a bracket or casting $a^4$ upon a projection of the main axle $l'$. This said bracket or casting is secured upon said axle by a split pin and collar $a^5$, which can be removed when it is required to take off the elevator-wheel. Said bracket also carries the support E for the basket, into which the potatoes are to be delivered, and the elevator-wheel is fitted with projections $a^6$ around its periphery to increase its hold upon the ground. The antifriction-rollers $a^2$ are grooved to correspond with a rail $a^7$, fitted around the inside of the elevator-wheel A, and which runs upon said rollers.

The rotating spiders G and H and share F are carried upon a frame K, which is pivoted at its forward end upon the counter-shaft L, and whose weight can be adjusted by means of a long hand-lever $k''$, having a catch $k^2$ working into a toothed quadrant $k^3$, secured upon a frame $k^4$, pivoted upon the main axle $l'$ of the machine. The frame $k^5$ to which the pole is attached is also pivoted, as shown at $k^6$, to the forward end of said frame $k^4$.

If preferred, the machine may be provided with a small land-wheel M upon an arm $m$, attached to a long hand-lever $m'$, whereby the elevator-wheel may be raised and lowered as required—for instance, when it is traveling along a road.

The operation of the invention is as follows: The share F raises the earth and potatoes onto the revolving spider G, which, with the second spider H, serves to deliver the potatoes into the curved trough $i^2$, whence they pass into the elevator-wheel A. The third spider I, being caused to rotate in the required direction, serves to separate the tops or halm and weeds from the potatoes and deliver them outside the elevator-wheel. Meanwhile a large proportion of the dirt will have fallen onto the ground through the spiders G H, and subsequently through the bottom of the elevator-wheel A. The potatoes will be raised by said elevator-wheel up the inner screen B and will be delivered by the blades $a'$ onto the screen C, down which they will pass onto the inclined screen or delivery-chute D, whereby they will be delivered into any convenient receptacle provided to receive them upon the support E.

The operation of the machine when the elevator-wheel is removed is substantially the same as that above described, except, of course, that the potatoes are not elevated into bags or other receptacles, but are delivered onto the ground in rows.

As shown in Fig. 1, I provide curved arms of spring or steel bar secured to the opposite end of the hub carrying the spider G in order to separate the tops from the tubers. As the share digs up the potatoes they are caught by the spider G, while the curved arms catch the tops. The spider disengages the potatoes from the tops, which are held by the curved arms, and delivers them with the aid of the second spider, while the curved arms deliver the potato-tops to the ground at the rear of the first spider.

Having now particularly described and ascertained the nature of my said invention and in what manner the same is to be performed, I declare that what I claim is—

1. In a potato-harvester, a frame, a plowshare supported thereby, and a pair of spiders for collecting the potatoes, said spiders being located in rear of the share and having their meeting edges substantially at the center line of the plow, the said spiders inclining upwardly and outwardly from each other toward opposite sides of the machine, substantially as described.

2. In combination in a potato-harvester, a frame, a plow carried thereby, a spider having its inner edge back of the plow and arranged on a shaft inclined in a plane transversely of the machine, a second spider having its inner edge adjacent to the edge of the first spider, the said second spider inclining outwardly and backwardly and being on a shaft inclined in a plane extending at an angle to the transverse plane of the first shaft, the said spiders being adapted to collect the potatoes dug by the plow the share of which presents a broad digging edge extending in front of the spiders, substantially as described.

3. A potato-digger comprising a plow, a spider in rear thereof adapted to receive the potatoes from the plow and a series of curved arms on the hub of said spider for separating the tops from the tubers, substantially as described.

4. In a potato-harvester, an elevator, a plow, a wheel, spiders G, H, delivering said potatoes to said wheel, and a third spider I located in the entrance to said elevator-wheel, substantially as described.

5. In a potato-harvester, a plow, an elevator-wheel, spiders delivering the potatoes to the said wheel, a trough to receive the potatoes and a third spider I within the said wheel, substantially as described.

JOSEPH NORTH COCKER.

Witnesses:
W. M. HARRIS,
WALTER J. SKERTEN.